United States Patent [19]
Deibert

[11] 4,328,766
[45] May 11, 1982

[54] RETRACTING COLLAR-MOUNTED LEASH

[76] Inventor: Daniel T. Deibert, P.O. Box 1553, San Marcos, Calif. 92069

[21] Appl. No.: 242,088

[22] Filed: Mar. 9, 1981

[51] Int. Cl.³ ............................................. A01K 27/00
[52] U.S. Cl. .................................................. 119/109
[58] Field of Search ............................. 119/109, 106; 242/107.4, 107.6

[56] References Cited

U.S. PATENT DOCUMENTS

| | | | |
|---|---|---|---|
| 2,821,960 | 2/1958 | Rudolph | 119/109 |
| 3,315,642 | 4/1967 | Rogers et al. | 119/109 |
| 4,197,817 | 4/1980 | Crutchfield | 119/109 |

FOREIGN PATENT DOCUMENTS

| | | | |
|---|---|---|---|
| 293374 | 9/1953 | Switzerland | 119/109 |
| 1546235 | 5/1979 | United Kingdom | 119/109 |

*Primary Examiner*—Jay N. Eskovitz
*Attorney, Agent, or Firm*—Henri J. A. Charmasson

[57] ABSTRACT

A casing which is intended to resemble a scaled-down brandy barrel mounts an internal shaft on which is journaled a sleeve which mounts a leaf spring and a coiled leash which extends through a slot in the casing. The collar also mounts a drum with spaced holes in its circumference which coact with a detent finger externally operable by a button which is designed to simulate a bung plug in the barrel. The barrel loops have extended bails through which the dog's collar engages.

4 Claims, 5 Drawing Figures

U.S. Patent May 11, 1982 4,328,766
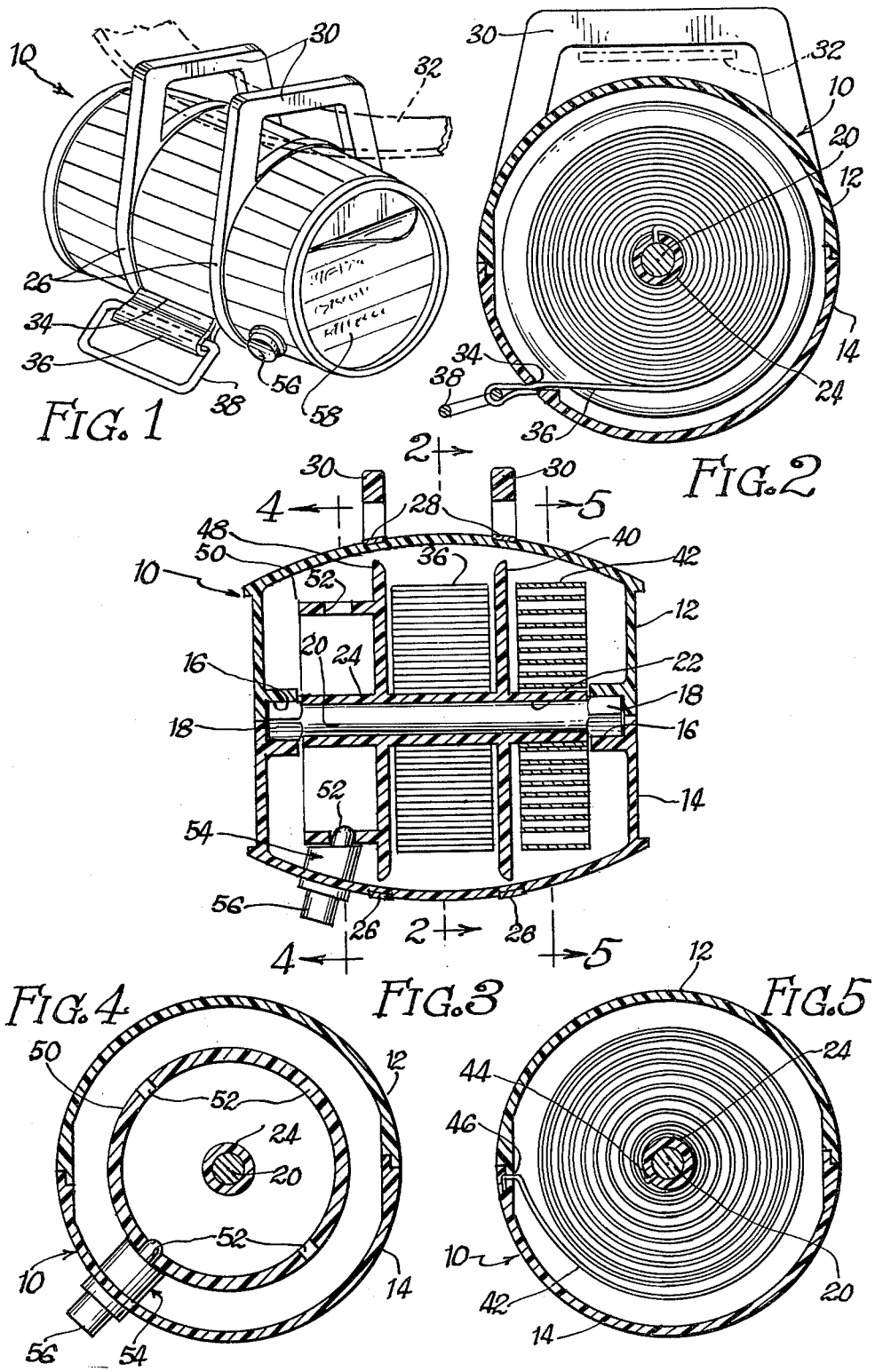

RETRACTING COLLAR-MOUNTED LEASH

BACKGROUND OF THE INVENTION

Especially in view of the increasing restrictions imposed on animals and particularly dogs which are kept as pets, including leash-length limits, leash requirements, fines for defecating on the street, etc., it is desirable to have a leash available so that in all circumstances it can be deployed to restrain the animals. A perpetually available leash conveniently attached to the dog's collar becomes increasingly advantageous and practical as the laws pertaining to dogs multiply, requiring the restriction of dogs, or the leashing of dogs, before or after a particular time, or on one side or another of a dividing line in a public park, in which it may be necessary to leash a dog which has previously been permitted to run free in a sudden fashion.

A number of self-coiling leash devices attached to the collar of the dog have been developed, some of which are bulky and complicated, and others of which are not made to permanently attach to the dog's collar because of the above stated problems.

There is a need, therefore, for an attactive, lightweight and compact dog leash which is self-winding and contained in a casing mounted to the dog's collar beneath his neck on a permanent basis.

SUMMARY OF THE INVENTION

The present invention fulfills the above stated need by providing in a compact, attractive casing which resembles a brandy barrel of the type which would be hung around a St. Bernard's neck, a spring-loaded, retractable leash. The barrel is made in two mating halves which together define square end sockets which lock in place the square ends of a longitudinally extended shaft. "Barrel hoop" type bands secure the two halves together with the shaft in place, and a sleeve is journaled on the shaft which mounts a divider separating the coil leaf spring and the wound up leash. A detent drum cooperates with an externally accessible, spring loaded detent which engages selectable spaced holes in the drum.

BRIEF DESCRIPTION OF THE DRAWINGS

FIG. 1 is a perspective view of the leash assembly showing its cooperation with a dog leash shown in phantom;

FIG. 2 is a section taken along line 2—2 of FIG. 3;

FIG. 3 is a section taken longitudinally of the assembly;

FIG. 4 is a section taken along line 4—4 of FIG. 3; and

FIG. 5 is a section taken along line 5—5 of FIG. 3.

DETAILED DESCRIPTION OF THE PREFERRED EMBODIMENT

The device is shown in FIG. 1 wherein casing 10 is shaped to simulate a brandy barrel. The casing is preferably comprised of two halves 12 and 14 which mate together at stepped edges and define together square sockets at the ends. These square sockets mount the square ends 18 of a shaft 20 which as a cylindrical center portion 22 on which is journaled a sleeve 24.

When the device is assembled, first the sleeve is put over the shaft, the shaft is laid into the square socket portions of one of the halves 12 or 14, and the other half is snapped into place. The two halves are held together by bands 26, which may be molded of plastic or the like and snapped into place in pre-cut grooves 28. Each of the bands has an upwardly extending bail 30 through which a dog collar 32 is engaged when in use.

The casing 10 has a slot 34 longitudinally defined in a central portion of the barrel, and a leash 36 extends through the slot, with its outer end mounting a ring 38 and the inner end being adhered to the central portion of the sleeve 24. The ring 38 prevents the leash from being wound entirely within the casing. There are many materials which are extremely strong, and yet very thin, flexible and lightweight, which could be used for the lease.

The sleeve defines an annular baffle 40 which separates the wound up leash 36 from the leaf spring 42 which is mounted to the sleeve at 44 at its inner end, and at its outer end engages in a relief provided in the mating edge of one of the halves as shown at 46.

On the other side of the wound up leash a second baffle 48 mounts a drum 50 having a plurality of spaced detent holes 52 therein.

These detent holes cooperate with spring-loaded detent 54, the external end 56 of which appears as a bung plug in the barrel shaped casing as best seen in FIG. 1. In the preferred embodiment, the detent 54 operates on a principle similar to that of a retractable ball point pen wherein a first depression of the button 56 protrudes the detent finger to engage one of the holes 52 and a second push will withdraw it, with the finger always being spring-loaded in its extended position so that in the event it strikes the barrel between holes, it will simply remain biased against the barrel until the barrel rotates to align the detent with one of the barrel holes. This implementation permits the complete freewheeling of the barrel, or alternatively the placing of the detent in lock-ready position, in which it will engage in the first hole that passes by.

Operation of the device is clear from the above stated description. Because the shaft 20 is non-rotationally locked in the barrel shaped casing, it does not rotate, but the sleeve 24 is free to rotate around it. When the leash 36 is pulled off of the sleeve, it winds up the spring. The detent 54 is actuated such that it locks the drum 50 at the desired length of extraction of leash. When it is desired to re-wind the leash, the detent button 56 is hit again, freeing the spool to retract under the operation of the spring.

The unit is only about an inch and a half wide, and is quite light inasmuch as it is mostly made of plastic and a lightweight leash material. It thus offers no real problem to the dog, and may even double as a dog tag by writing the name and address of the owner as shown at 58. Because the leash is available at all times, with no detriment to the dog, it is the ideal dog restraining means.

While I have described the preferred embodiment of the invention, other embodiments may be devised and different uses may be achieved without departing from the spirit and scope of the appended claims.

What is claimed is:

1. A spring-would leash assembly to be carried on a dog collar comprising:
   (a) a generally cylindrical elongated casing shaped to simulate a barrel having a longitudinal slot therein and means to attach the casing to a collar comprising a pair of spaced loops simulating barrel hoops and having bails to receive a collar;

(b) a shaft mounted coaxially of said casing;
(c) a sleeve journaled on said shaft;
(d) a leaf spring engaging said sleeve at its inner end and wound in one direction therearound with the outer end engaging said casing;
(e) a flexible leash attached to said sleeve and wound around same in said one direction and extending out through said slot;
(f) detent means for alternatively locking or releasing said sleeve relative to said casing; and
(g) wherein said casing comprises a pair of longitudinally split halves together defining annular grooves and being bound together by said pair of loops simulating barrel hoops, which are snapped over said casing into said grooves such that said halves are held together by said hoops and said assembly requires no auxiliary fasteners.

2. Structure according to claim 1 wherein said halves together define square sockets and said shaft is centrally cylindrical with square ends to non-rotationally engage in said sockets without the use of fasteners other than said loops.

3. Structure according to claim 1 wherein said sleeve mounts an extended annular separator separating said spring from said leash and said sleeve also mounts a drum with detent holes spaced around its circumference, and said detent includes a spring-loaded peg extending inwardly from said casing to selectably engage said holes and said peg has a button extending out through said casing to simulate a bung plug in the barrel simulated by said casing.

4. Structure according to claim 1 wherein the outer end of said spring is engaged between the facing edges of said split halves and the inner end thereof is inserted in a slot in said sleeve such that said spring is held in place by the inherent nature of said halves being retained by said loops and no fasteners are required.

* * * * *